(12) United States Patent
Tu et al.

(10) Patent No.: US 11,275,443 B1
(45) Date of Patent: Mar. 15, 2022

(54) VARIABLE-RESISTANCE ACTUATOR

(71) Applicant: Facebook Technologies, LLC, Menlo Park, CA (US)

(72) Inventors: Elizabeth Tu, Seattle, WA (US); Lorenz Henric Jentz, Seattle, WA (US); Khaled Boulos, Seattle, WA (US); Derrick Readinger, Redmond, WA (US); Robert Carey Leonard, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 34 days.

(21) Appl. No.: 16/682,724

(22) Filed: Nov. 13, 2019

Related U.S. Application Data

(60) Provisional application No. 62/904,054, filed on Sep. 23, 2019.

(51) Int. Cl.

| | |
|---|---|
| *G06F 3/01* | (2006.01) |
| *G06F 3/0338* | (2013.01) |
| *A63F 13/285* | (2014.01) |
| *B06B 1/04* | (2006.01) |
| *H04R 9/06* | (2006.01) |
| *H02K 33/18* | (2006.01) |

(52) U.S. Cl.
CPC ............ *G06F 3/016* (2013.01); *A63F 13/285* (2014.09); *G06F 3/0338* (2013.01); *B06B 1/045* (2013.01); *G06F 3/012* (2013.01); *G06F 2203/015* (2013.01); *H02K 33/18* (2013.01); *H04R 9/06* (2013.01); *H04R 2499/11* (2013.01)

(58) Field of Classification Search
CPC ........ G06F 3/016; G06F 3/0338; G06F 3/012; H04R 9/06; H04R 2499/11; H02K 33/18; B06B 1/045; A63F 13/285
See application file for complete search history.

(56) References Cited

U.S. PATENT DOCUMENTS

| | | | |
|---|---|---|---|
| 2016/0175186 A1* | 6/2016 | Shadduck | A61H 19/40 601/15 |
| 2017/0212589 A1* | 7/2017 | Domenikos | G06F 3/016 |
| 2018/0190087 A1* | 7/2018 | Maalouf | G06F 3/014 |
| 2019/0025869 A1* | 1/2019 | Parazynski | B64C 13/04 |
| 2020/0348757 A1* | 11/2020 | Forest | G06F 1/1626 |

* cited by examiner

*Primary Examiner* — Kwin Xie
(74) *Attorney, Agent, or Firm* — FisherBroyles, LLP

(57) ABSTRACT

The disclosed system may include a substructure configured to support various components, an actuator configured to provide substantially linear motion along a specified axis in response to an electrical input, an input component hingedly coupled to the substructure, where the input component is configured to receive input from a user, and a mechanical linkage coupled to the input component and to at least a portion of the actuator. The mechanical linkage may be configured to translate the substantially linear motion provided by the actuator to a rotary force applied to the input component via the mechanical linkage. Various other methods, systems, and computer-readable media are also disclosed.

20 Claims, 15 Drawing Sheets

VARIABLE-RESISTANCE ACTUATOR

CROSS REFERENCE TO RELATED APPLICATION

This application claims priority to and the benefit of U.S. Prov. Application No. 62/904,054, filed Sep. 23, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1A:
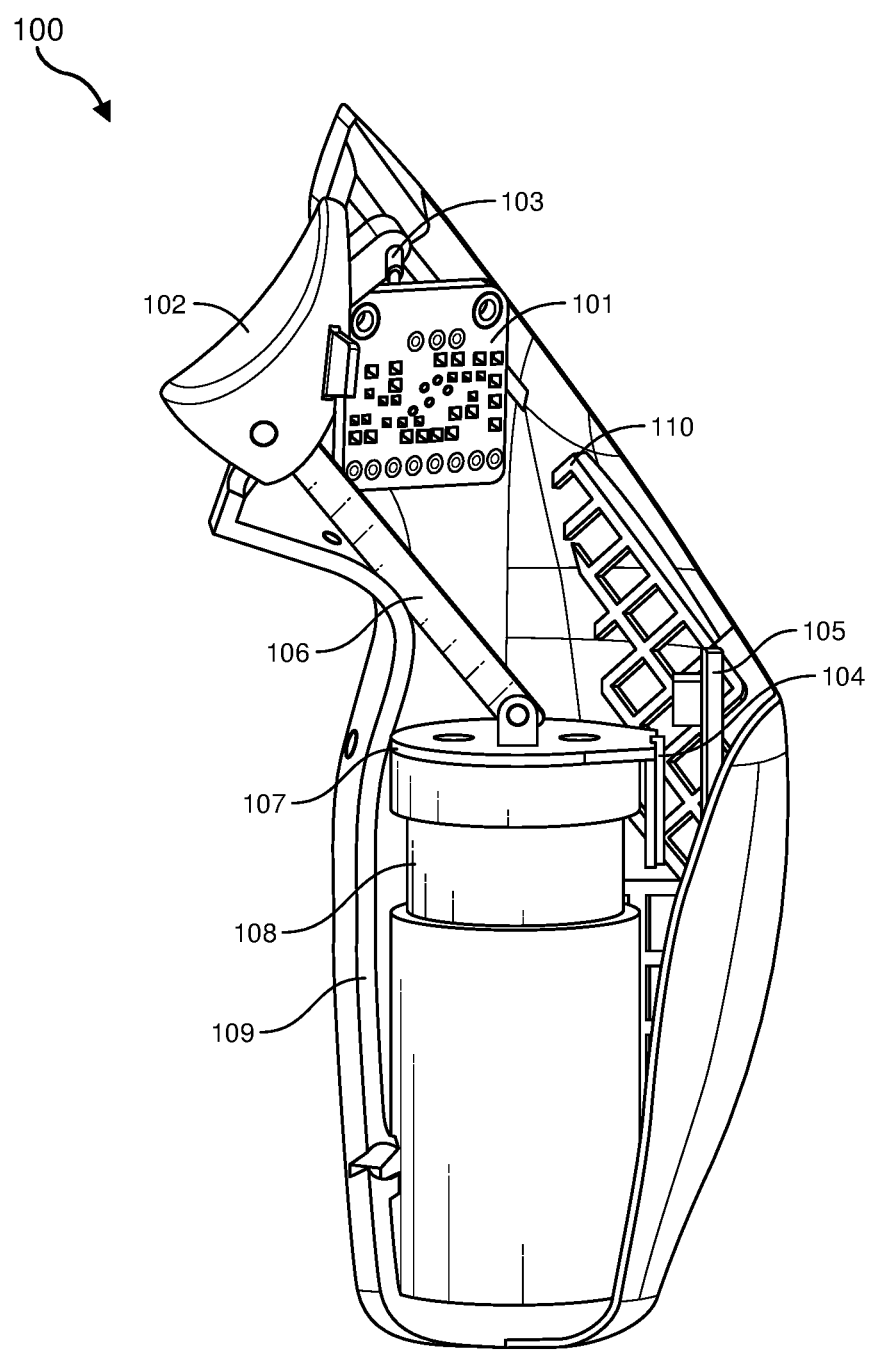
FIGS. 1A and 1B illustrate component views of an embodiment of a variable-resistance actuator.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for controlling an actuator to provide a variable amount of resistance or force feedback in a peripheral device. In the past, traditional actuators would vibrate or buzz to provide tactile feedback to the user. For example, previous video game controllers have implemented rotating actuators of various sizes to provide vibrations or buzzing sensations. For instance, when a user performs a certain move in a video game or when certain environmental elements are changing, the user's controller would buzz to let the user know the move had been performed or that the user should expect changes within the game.

Some game controllers have buttons or triggers that allow a user to provide a measured input. For instance, a trigger on a game controller may have a certain amount of travel and, if the user is only lightly pulling on the trigger, the smaller amount of input will be registered in the game. Thus, for example, if a user is playing a car racing game and the trigger is mapped to the car's acceleration, when the user pulls the trigger partially backwards, the acceleration of the car will be slower, whereas if the user pulls the trigger all the way backwards, the acceleration of the car will be faster. These triggers thus allow for a measured input that can be anywhere between fully on and fully off. However, most traditional triggers and other similar input components are installed with springs. These springs keep the button or trigger in their original position unless pressed upon. The springs provide a constant counterforce to the user's button presses or trigger squeezes.

In contrast to these systems that provide input components with constant counterforce or that only provide vibrations or buzzing, embodiments of the present disclosure provide systems and methods that control an actuator to provide a variable amount of resistance and different types of force feedback. These embodiments may be applied in a wide variety of different scenarios, but may specifically apply in the field of peripheral devices such as video game controllers, wireless controllers used in artificial reality systems (e.g., artificial reality systems 900 or 1000 of FIG. 9 or 10 below), remote controls, disability assist devices, computer mice, or other types of peripheral devices that have input components such as buttons or triggers.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1A-8, detailed descriptions of embodiments in which actuators are controlled to provide a variable amount of resistance or force feedback in a peripheral device. FIG. 1A, for example, illustrates an example embodiment of a peripheral device 100 that is designed to provide a variable amount of counterforce to a user when the user squeezes the trigger 102. The peripheral device 100 may include a substructure 110 that is configured to support various components of the peripheral device including external buttons and triggers (e.g., 102), as well as internal components such as sensors and actuators. The substructure 110 may be formed as an interior structure onto which an outer shell or cover is later applied (as shown in FIG. 1B). Or, in other cases, the substructure 110 and the exterior covering (e.g., 111) may be combined into a single mold or piece.

The substructure 110 may house many different internal and external-facing components. For instance, the substructure 110 may house an actuator 109. The actuator 109 may include a magnet and a coil 108 along with a coil mount 107 that allows the actuator to be coupled to other components.

The actuator 109 may be any type of actuator including a voice coil actuator (VCA), a geared direct current (DC) motor, a servo motor, a direct drive linear motor, a solenoid, or other type of actuator. A VCA may include a coil of wire (or other conductive material) and a magnet. When a current is applied to the coil, the magnet will accelerate based on the direction and the amount of the applied current. Thus, if a large amount of current is applied to the coil, the magnet will accelerate a correspondingly large amount; similarly, if a small amount of current is applied to the coil, the magnet will accelerate a correspondingly small amount. The amount of acceleration of the magnet in the VCA (in either direction along the axis) may thus be carefully controlled by regulating the amount of current. As will be explained in greater detail below, the VCA (or other type of actuator) may be used to apply a variable amount of force or resistance to the trigger 102 or other inputs components.

The VCA may be affixed to the substructure 110 in a vertical manner, such that, depending on the flow of the current, the magnet may move linearly along an axis toward one end of the coil or the other. Thus, as shown in FIG. 1A, the coil 108 moves vertically up and down along an axis that is fixed relative to the substructure 110. The magnet may be attached to a coil mount 107 of the actuator 109 such that when the magnet moves along the axis, the coil mount also moves along the same axis. The coil mount 107 of the actuator 109 may be coupled to the mechanical linkage 106. The mechanical linkage 106 may be substantially straight, or may include curves, hinged portions, or differently-shaped sections. The mechanical linkage 106 may connect the actuator 109 to the input component (e.g., trigger 102). In some embodiments, the trigger 102 may be hingedly connected to the substructure or to a housing of the system via hinge 103. The hinged connection may allow the trigger 102 (or other input component) to rotate in a circular motion (as described further below with relation to FIGS. 3A-3C). Because the mechanical linkage 106 is connected, at one end, to the actuator 109, and at the other end to the trigger 102, movements of the actuator 109 may be translated to a rotational force (either backward or forward depending on which direction the magnet is moving along the axis). This rotational force is applied to the trigger 102 and may register as a counterforce to the user's pulling motion.

It should be understood that, while many of the embodiments described herein reference a trigger in a game controller, the described system may be any type of peripheral device that connects to or controls an electronic system, and may include any type or number of input components including buttons, triggers, joysticks, trackpads, sliders, knobs, dials, or other types of input components. These input components may be configured to receive inputs from a user, for example, via the user's fingers. The user may squeeze a trigger or push a button, for instance, and provide a precise input to the system. A processor or controller in the system (e.g., 101) may process the input and determine the amount of force being applied to the trigger and/or may determine the position of the trigger. The processor or controller may also be configured to determine the speed at which the trigger was pulled. In the embodiments herein, when the user pulls on the trigger 102 or provides another type of input via an input component, the actuator may apply a counterforce or a rotational resistance to the user's pulling motion. This counterforce or force feedback may be applied as the coil mount 107 moves and translates the linear motion through the mechanical linkage 106 and on to a rotary force that is applied to the trigger 102. Thus, as the user pulls back on the trigger 102 and the trigger hinges backwards towards the user, the actuator 109 may apply a variable and fully configurable counterforce.

Thus, in cases where the input component is a trigger or button, the system may provide a direct rotational force to the trigger. This is different than conventional systems that only apply a buzzing or vibration. Still further, while traditional systems only apply the buzzing or vibration in a binary, on or off manner, the systems described herein may apply the direct rotational force to the input component in a variable manner, with a relatively large amount of force (e.g., potentially large enough to prevent movement of the trigger even when the trigger is pulled by the user) or with a relatively small amount of force (e.g., small enough to where the force is barely perceptible by the user). The rotational force may be applied suddenly or may be applied gradually over time or may be applied according to a force profile that is designed to simulate a specific tactile feel (e.g., shooting a gun).

In some embodiments, substructure 110 of the peripheral device 100 may provide support for other components such as an optical encoder 105. The optical encoder 105 (or other similar measurement device) may be configured to determine the current position and/or the current direction of travel of the actuator 109. The optical encoder 105 may determine the current position and/or direction of travel of the actuator 109 by measuring how far and in which direction the magnet and/or the coil mount 107 of the actuator have traveled along the axis in relation to the encoder strip 104. Then, the variable amount of rotary force applied to the trigger 102 or other input component (i.e., a counterforce that runs substantially perpendicular to the travel path of the trigger) may be based on the current position and/or direction of travel of the actuator 109. Thus, for example, if the trigger travels from an initial, extended position to a final, contracted position, the rotary force may increase in a linear or logarithmic or other specified manner as the trigger travels backward toward the user. Other sensors may be electrically connected to the processor or controller including accelerometers, pressure sensors, cameras, inertial measurement units, or other types of sensors. These sensors may also be mounted to the substructure 110 of peripheral device 100 in various positions.

Figure 1B:
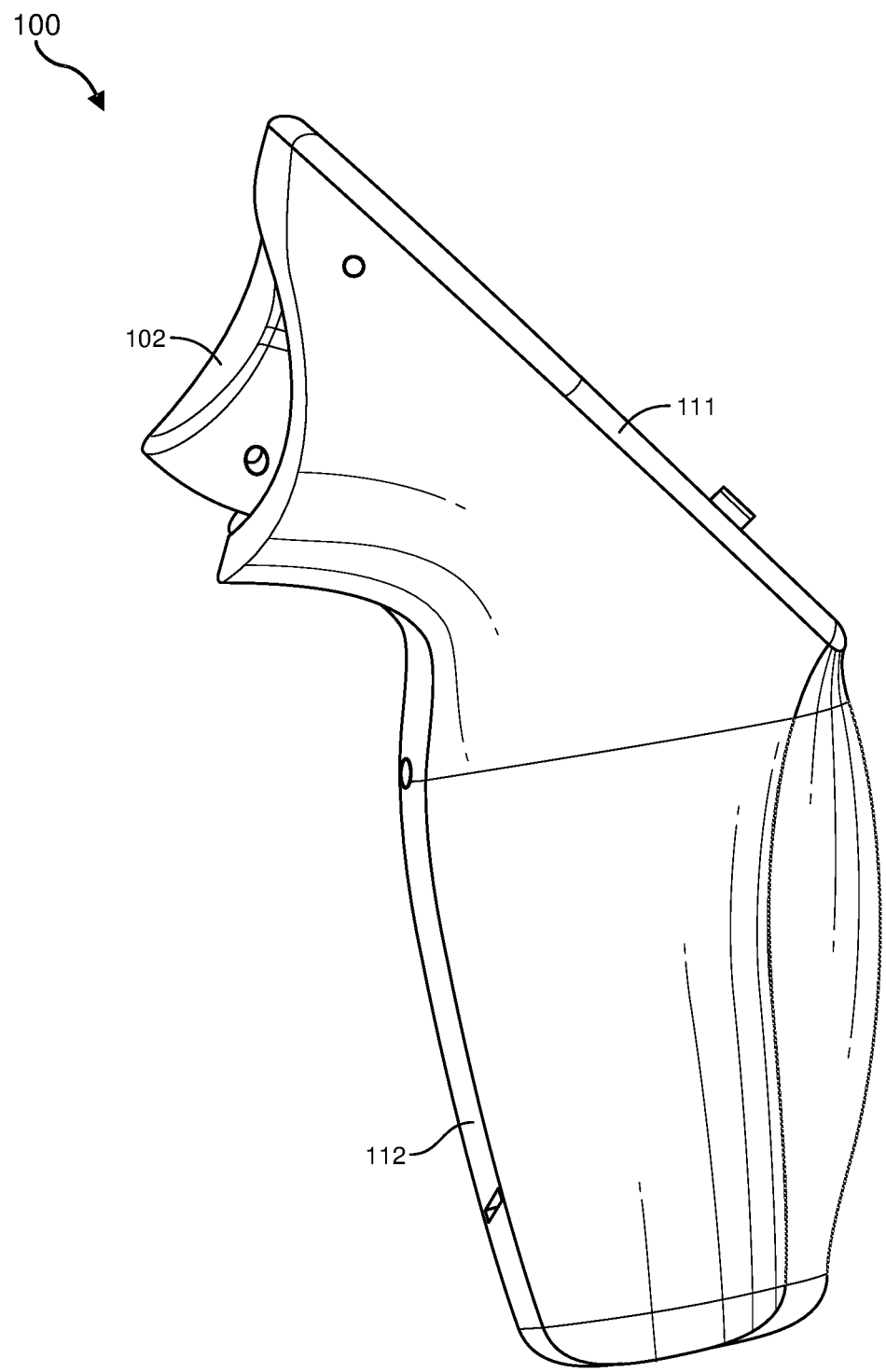

FIG. 1B illustrates an embodiment in which the peripheral device 100 includes an outer covering or housing 111. The housing 111 may cover the entire device 100 or only specific portions thereof. In some cases, the peripheral device 100 may include a contoured handle 112 that is designed to fit into the contours of the user's hand. Thus, as the user holds the peripheral device 100, the user may maintain a solid grip on the device for precise control and movement.

Figure 2:
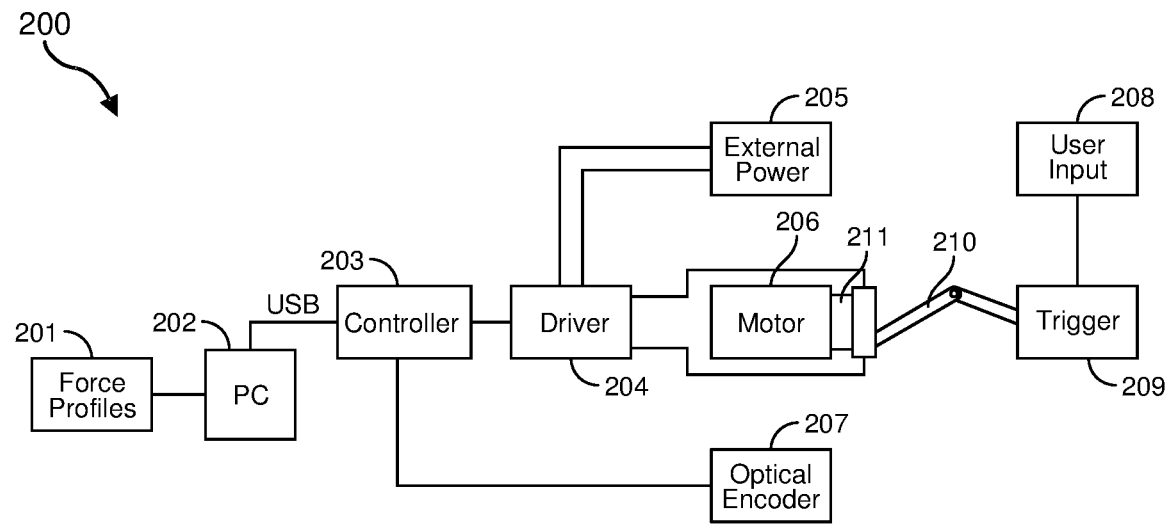
FIG. 2 illustrates an example system diagram for one embodiment of a variable-resistance actuator.

FIG. 2 illustrates a system diagram 200 for the peripheral device 100. At least some of the components illustrated in the system diagram 200 may be optional or may merely be linked to the peripheral device 100, such as through a wired or wireless network connection. For example, the peripheral device 100 may include a controller 203 or microcontroller unit (MCU) such as an application-specific integrated circuit (ASIC), a field-programmable gate array (FPGA), a programmable system on a chip (PSOC) or other type of purpose-specific processor or controller. The controller 203 may be communicatively connected to a personal computer (PC 202), laptop, or other computing device to load force profiles 201 onto the peripheral device. The system diagram 200 further notes that the controller 203 may be communicatively connected to a driver 204 which applies power from an external power source 205 to the motor 206 (e.g., the actuator 109 of FIG. 1A). The controller 203 may also be communicatively connected to the optical encoder 207 to receive sensor inputs indicating the current position of the motor (or, more specifically, the position of the magnet of the VCA). The motor 206 may be connected to the trigger 209 or other input component via a mechanical linkage 210 which, in this case, is a hinged linkage. Accordingly, as user input 208 is applied to trigger 209, the motor may apply a variable counterforce through the linkage 210 that translates to a rotary force applied to the trigger 209. This process will be described further below with regard to FIGS. 3A-3C.

Figure 3A:
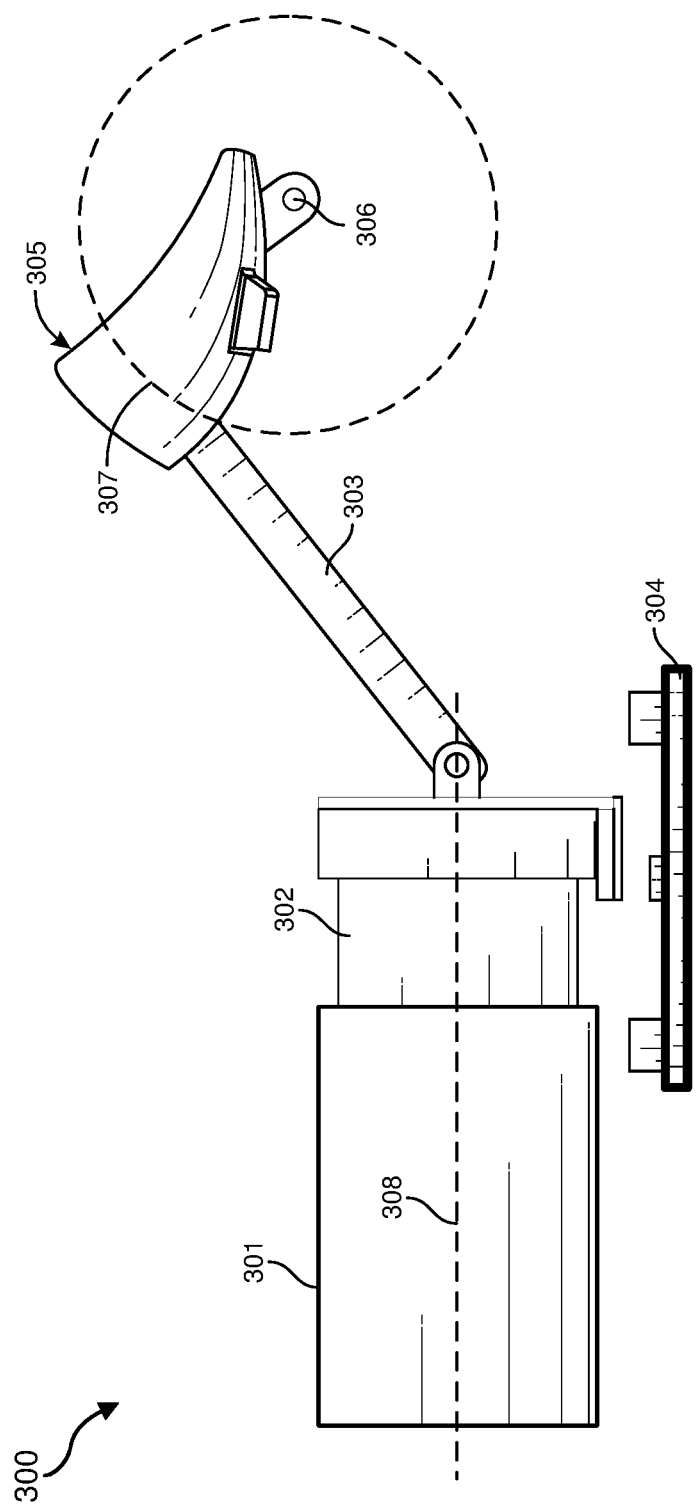
FIGS. 3A-3C illustrate embodiments in which force feedback is applied in a variable manner to an input received at an input component.
Figure 3B:
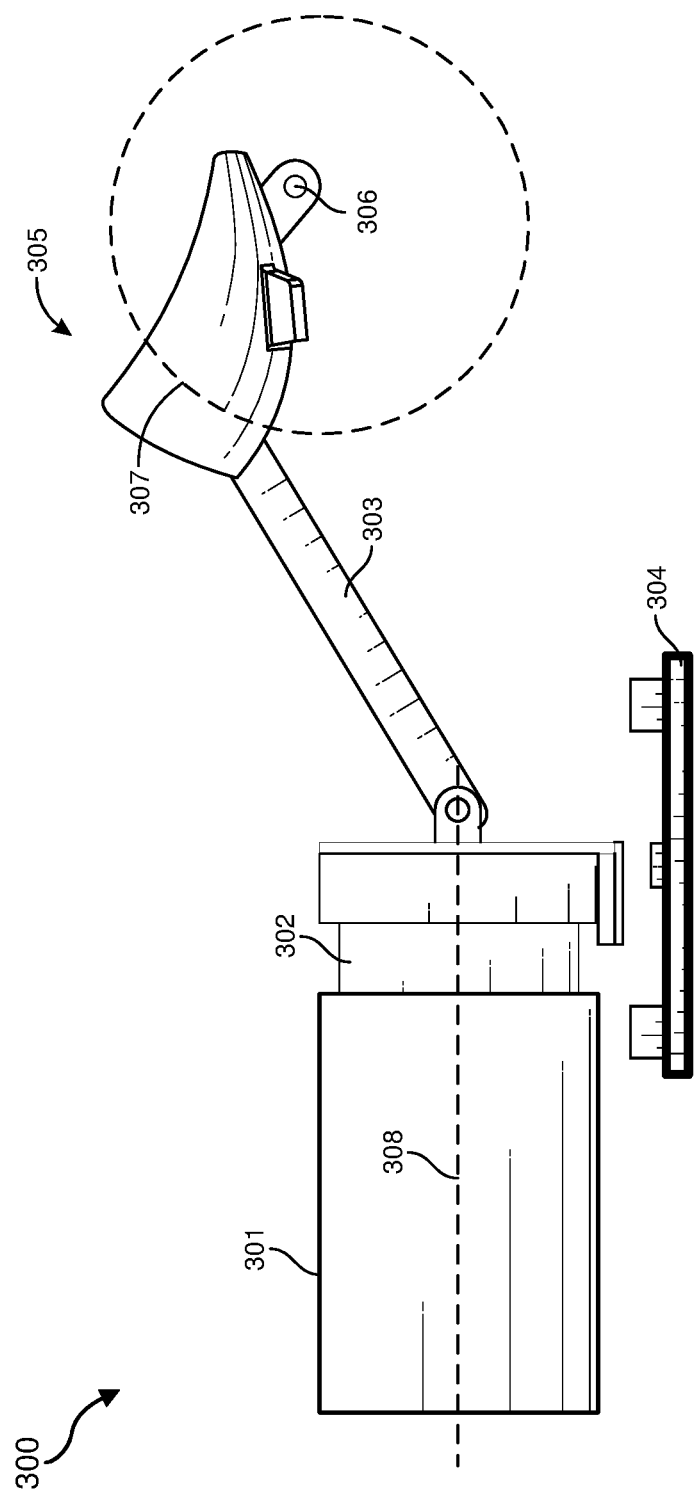
Figure 3C:
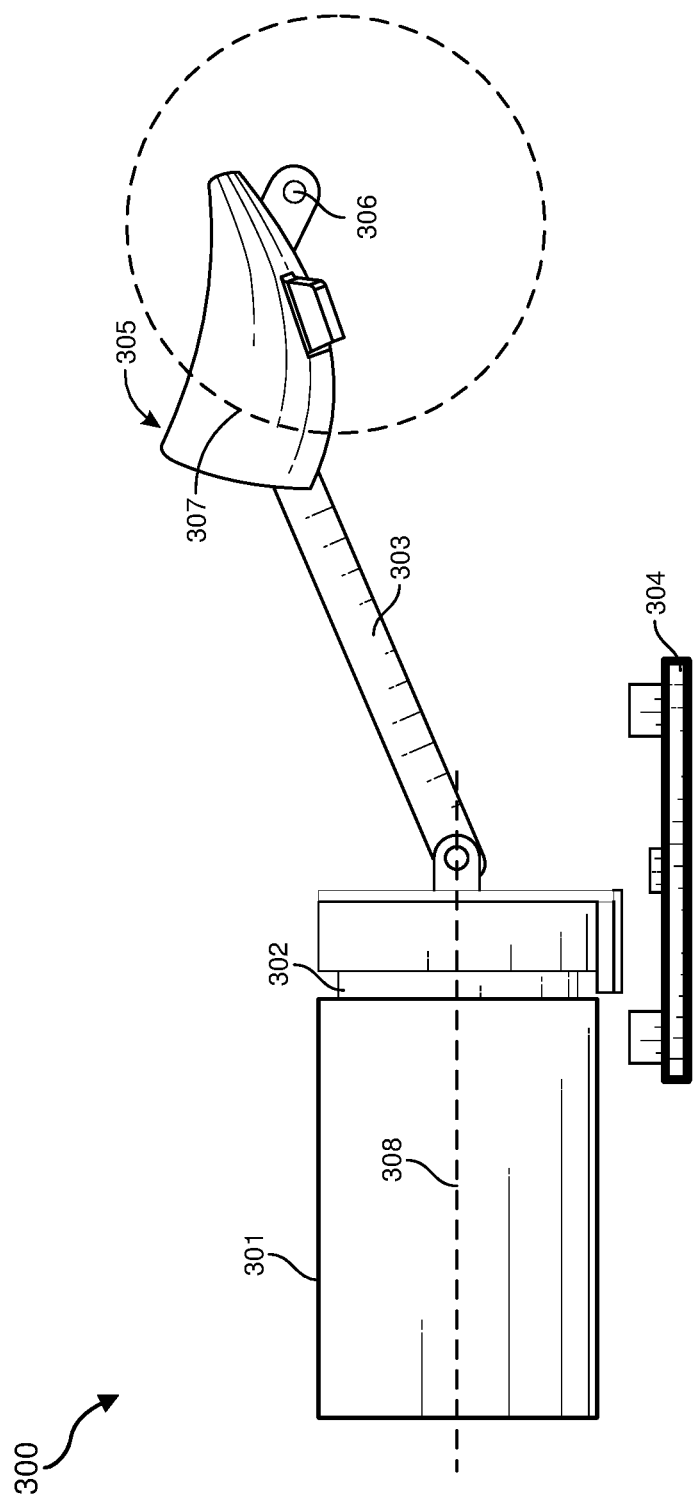

FIGS. 3A-3C illustrates a progression in which no counterforce is being applied to the trigger 305 (as in FIG. 3A), to a midway position where at least some counterforce is being applied to the trigger 305 (as in FIG. 3B), to a final position where a large amount of counterforce is being applied to the trigger 305 (as in FIG. 3C). The components of FIGS. 3A-3C (e.g., 300) may be incorporated into a peripheral device such as device 100 of FIG. 1. The components 300 of FIGS. 3A-3C may be incorporated into a wireless game controller, for example, or into a remote control or disability assist device. The peripheral device may include many different input components, although only one input component (e.g., trigger 305) is shown in FIGS. 3A-3C. In some embodiments, the trigger 305 may be a force feedback trigger that is mounted to the wireless game controller or other type of electronic peripheral device. The actuator 301 may include a coil 302 that is coupled to a mechanical linkage 303. As an electrical current is applied to the actuator 301, one or more portions of the actuator (e.g., the magnet) may move relative to the coil 302. When the magnet moves, the mechanical linkage 303 may also move.

The mechanical linkage may be hingedly connected to the trigger 305 via hinge 307. The trigger itself 305 may be hingedly mounted to a fixed hinge 306. The trigger 305 may be pulled on the axis provided by hinge 306 and may move downward along the circular arc (shown in dotted line) when pulled by a user. Thus, the hinge 307 may be in the position illustrated in FIG. 3A when the trigger is not being pulled, may be in the position illustrated in FIG. 3B when the trigger is halfway pulled, and may be in the position illustrated in FIG. 3C when the trigger is fully pulled. Other intermediate positions between the three illustrated are also possible. Indeed, the trigger may be pulled in an analog manner into substantially any position between the fully open position in FIG. 3A and the fully closed position in FIG. 3C.

Similarly, the amount of counterforce applied to the trigger 305 by the actuator 301 may also be variable and may be controllable and programmable. In contrast to traditional tactile systems that buzz or spin, the counterforce applied by the actuator 301 (e.g., a VCA) may be applied linearly and smoothly. When the actuator moves along axis 308, the substantially linear force may be applied and translated (via the mechanical linkage 303) into a rotational force applied to the back of the trigger 305. In some cases, the amount of counterforce applied to the trigger 305 may be equivalent to or greater than the amount of pulling force applied to the trigger by the user. Applying a counterforce in this manner may allow for many tactile sensations not previously available.

In some cases, the electronic components 300 may include an optical encoder 304. The optical encoder 304 may be configured to determine the current position of the actuator (or at least a portion thereof). The amount of counterforce applied by the actuator 301 may be dependent on the current position of the actuator. For instance, in one example, if the trigger is only lightly squeezed, the amount of counterforce may be very small. However, the amount of counterforce may increase linearly as the user squeezes harder on the trigger 305 until (or before) the trigger reaches the stopping point (as in FIG. 3C). In other cases, the amount of counterforce applied to the trigger 305 may start small and increase in a logarithmic manner. Or, the counterforce may be applied in the opposite manner such that the force is very high at first and decreases linearly or logarithmically as the trigger is squeezed tighter. The actuator 301 may also be configured to apply a resistive force once the trigger is let go or once the pulling force on the trigger provided by the user has begun to ease. As the user stops pulling on the trigger, the actuator 301 may prevent the trigger from sliding back to its originating position (as in FIG. 3A) or may cause the trigger to slowly return to the originating position. Thus, the actuator may provide a variable amount of force based on the current position of the actuator. In some cases, as will be seen below, the actuator may apply counterforces not only in linear or logarithmic manners, but also according to profiles that simulate specific tactile experiences.

Figure 4:
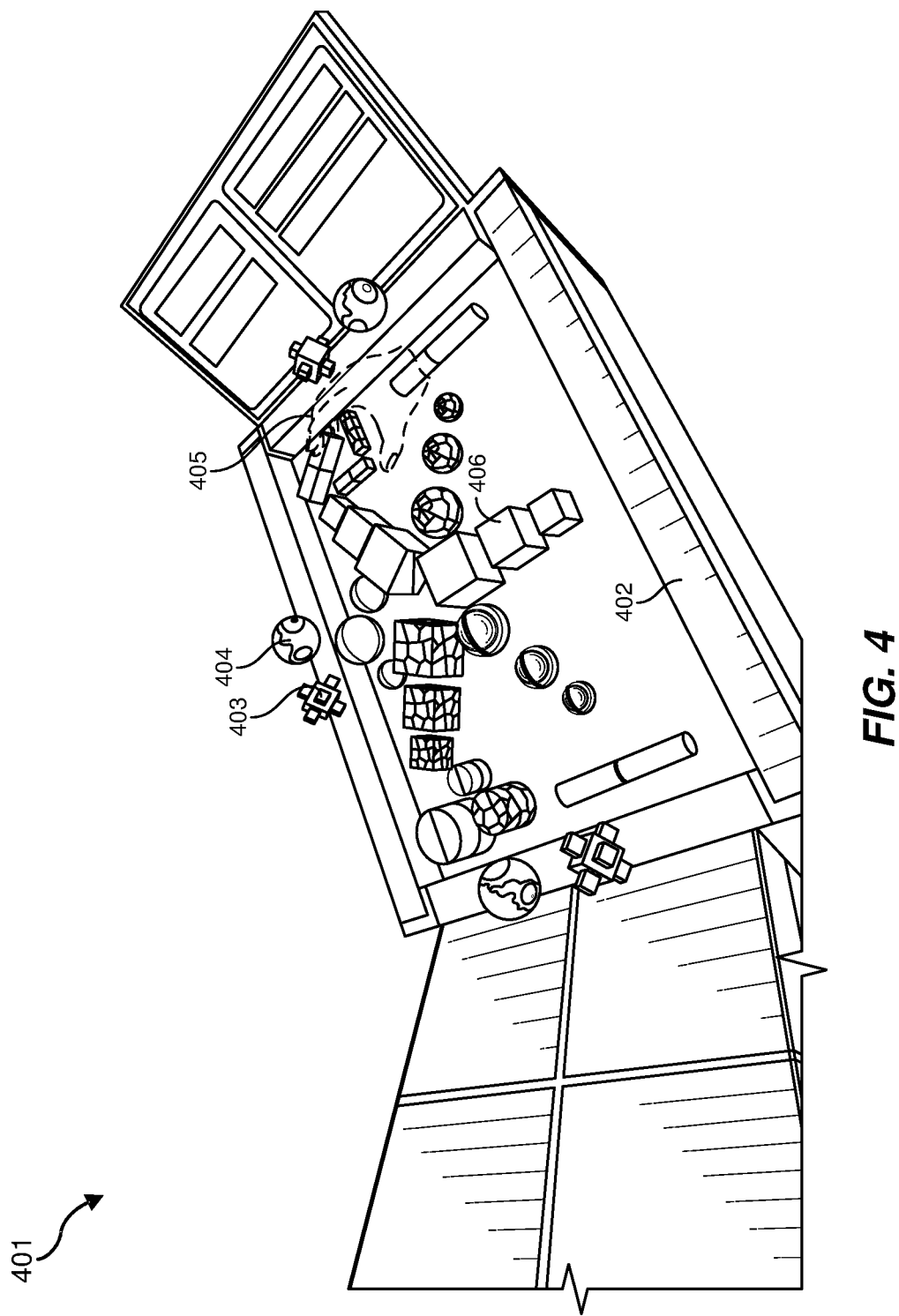
FIG. 4 illustrates an example user interface scene in which a force profile is implemented to apply force to an input component.

Indeed, as shown in FIG. 4, the electronic peripheral device may be used to interact with a virtual environment. The virtual environment 401 may include multiple different elements laid out on a tray 402 with which the user may interact. These interactions may include picking up the object, throwing the object, squeezing the object, touching the object, stacking the objects, or interacting with the objects in another way. The tray 402 may include many different types of virtual objects including boxy objects 403, spherical objects 404, or other types of objects. The virtual environment 401 may also show a representation of the user's hand 405 as it moves from object to object. When a user presses a button or squeezes a trigger on the electronic peripheral device (e.g., 100 of FIG. 1A), the actuator 109 may provide a counterforce that simulates touching that object. For example, if the virtual object is bumpy and the user is squeezing the object by pulling the trigger 102, the actuator may provide a counterforce that simulates the amount of resistance that would be provided by a hard, dense object, or the amount of resistance that would be provided by a soft, squishy object, etc. The amount of counterforce on the trigger may change very quickly over time, allowing the trigger (or other input component) to convey a tactile feel similar to that portrayed in the virtual environment 401.

Figure 5:
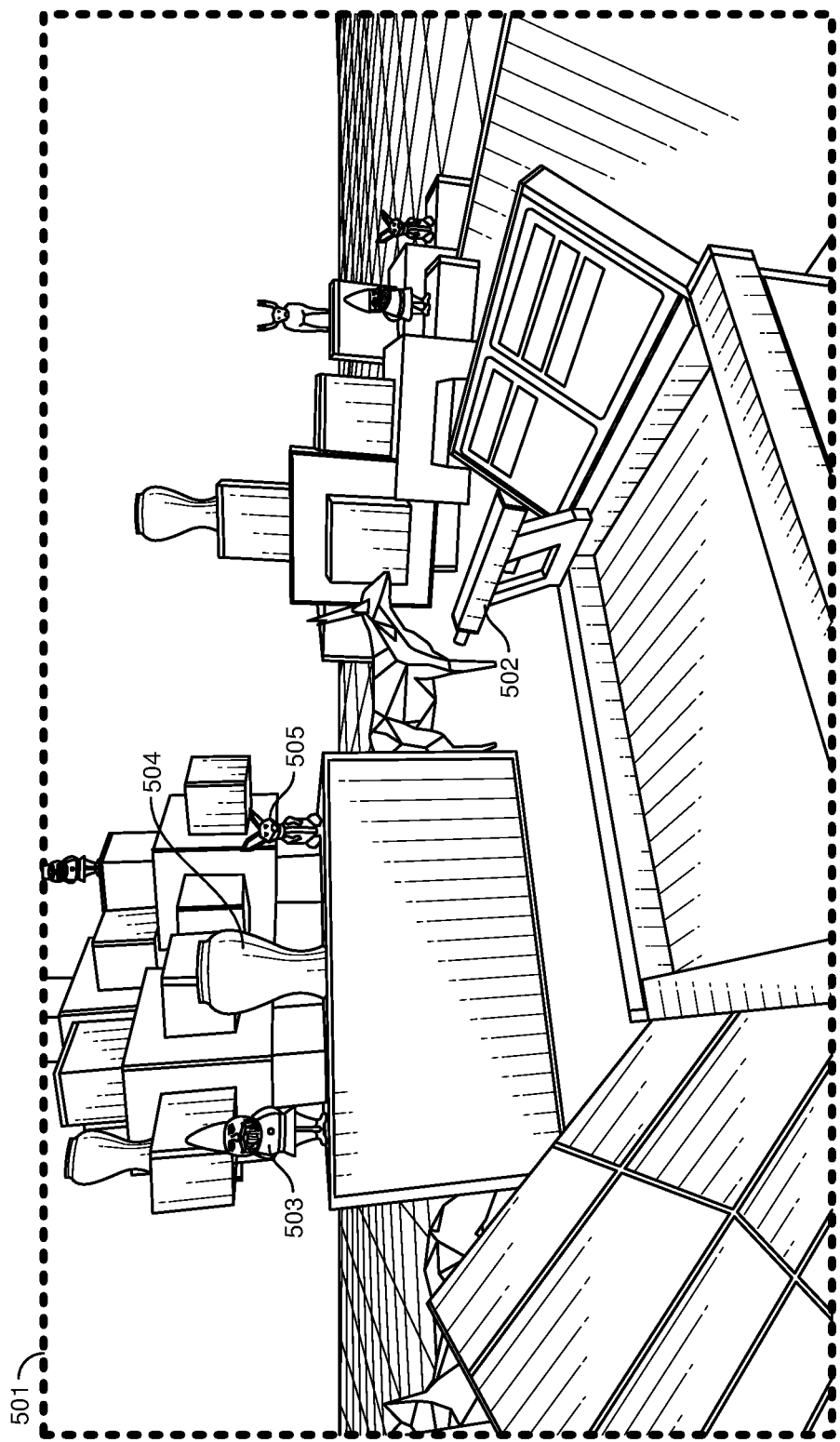
FIG. 5 illustrates an alternative example user interface scene in which a force profile is implemented to apply force to an input component.

In other embodiments, as shown in FIG. 5, a virtual environment 501 may provide a virtual experience where a user may shoot a gun at various objects. For instance, a user may use gun 502 to shoot at a gnome 503, or a vase 504, or a rabbit 505. When the user holds the gun and pulls the trigger on the virtual gun 502, the real-life controller (e.g., 100 of FIG. 1) may simulate the feel of pulling the trigger and firing a real-life weapon. For example, the actuator 109 of FIG. 1 may be configured to provide counterforce on the trigger 102 that follows a force curve that would be experienced in real life. For instance, in some real-life guns, pulling the trigger cocks a hammer backwards which then releases and strikes the pin, firing the bullet. This force curve, which gets harder as the hammer cocks backwards, may be simulated on the peripheral device 100. Then, when the hammer strikes, the counterforce previously applied at the trigger 102 is reduced or release entirely and the virtual gun fires. This is one of many different force profiles that may be applied by the actuator 109.

Figure 6:
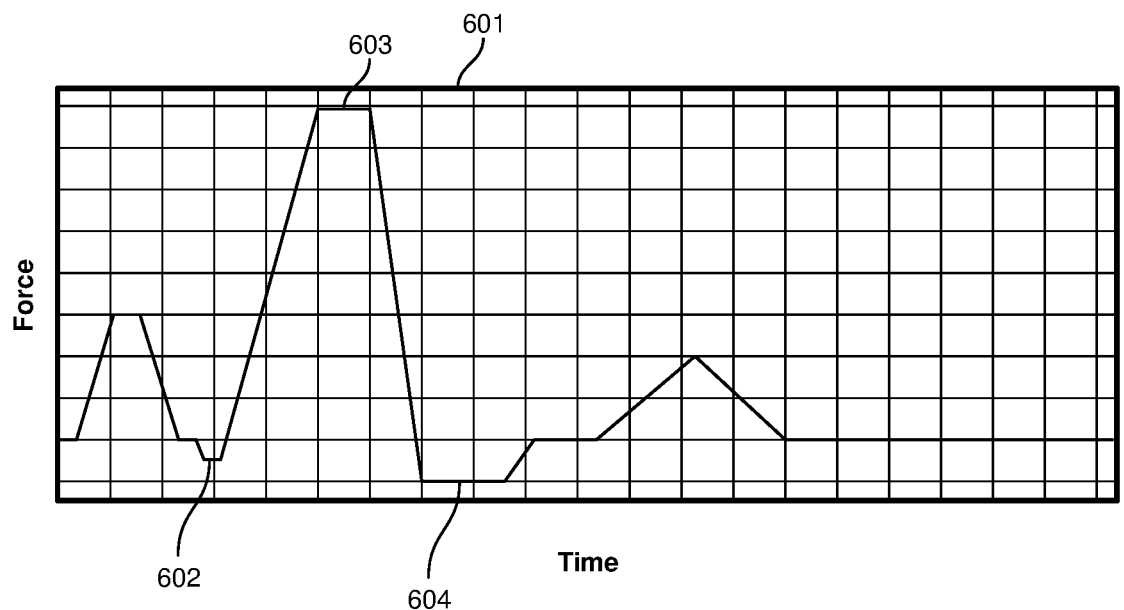
FIG. 6 illustrates an example force profile according to which force may be applied to an input component.
Figure 7:
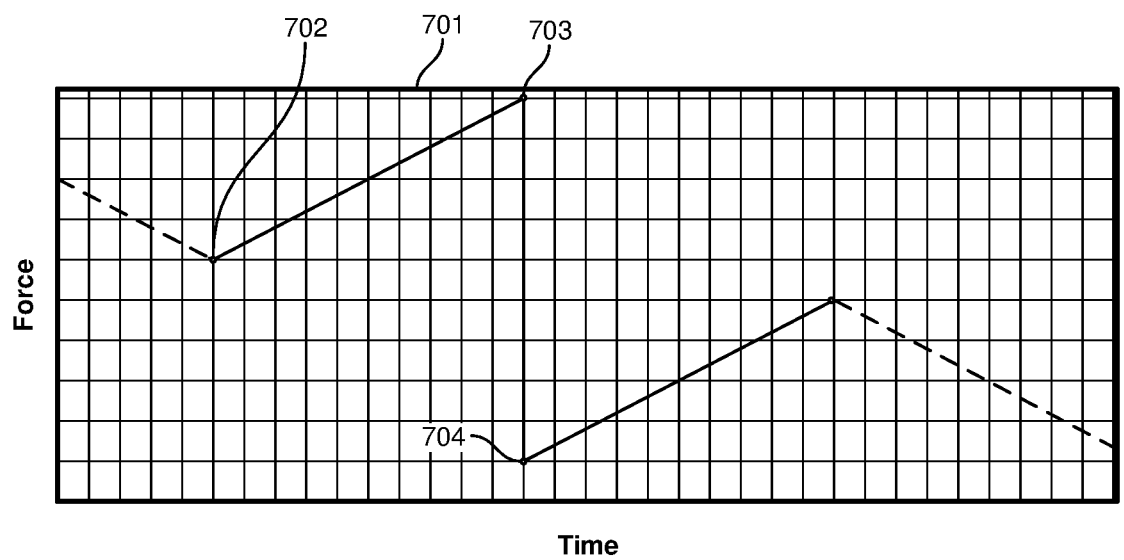
FIG. 7 illustrates an alternative example force profile according to which force may be applied to an input component.

For example, FIGS. 6 and 7 illustrate various force profiles that may be applied by an actuator such as a VCA.

The force profile 601 shown in FIG. 6 shows force on the y-axis and time on the x-axis. As time goes by, various levels of force are applied, including at point 602 where the amount of force is rapidly increased to a specified amount and then, at point 603, is rapidly decreased, reaching a new, lower level of counterforce at point 604. Other minimum and maximum levels of counterforce may be used, and different rates or increase or decrease in force may also be used. The force profile in FIG. 6 may simulate a heartbeat. Thus, if a user were playing a video game in a virtual environment, the user may hold the trigger and feel the tactile sensations of a heartbeat.

In FIG. 7, force profile 701 may be implemented by electronic peripheral device 100 of FIG. 1. The actuator 109 of device 100 may provide a linearly increasing force starting at time point 702. The counterforce applied by the actuator 109 may increase until time 703 at which the counterforce drops substantially instantly to the lower counterforce level at point 704. At point 704, the amount of counterforce may again increase linearly, and so on. This force profile 701 may be configured to simulate an object breaking, where the object breaks at time 703. Many other force profiles may be programmed and implemented to provide different tactile sensations on a trigger, button, or other input component.

When the actuator is providing counterforce, either according to a force profile or according to other control signals, the actuator 109 may move along its axis until a specified stop position is reached (e.g., as shown in FIG. 3C). The stop position may be dictated by a physical limitation (e.g., the trigger or button is fully extended or contracted) or may be dictated by a software-based limitation. For instance, a software input may indicate that, within a virtual environment, a user is touching or squeezing a virtual object. The actuator may apply a variable rotary force or resistance to the trigger 102 to give the user the sensation that they are touching or squeezing a physical object. The software input may place a "stop" at a certain position and the actuator may apply sufficient force to the trigger through the mechanical linkage 106 that the user may no longer be able to further squeeze the trigger or push the button, even though the trigger or button is not fully depressed. These software-based stops may be applied at any point in the trigger or button's travel and the positions of the stops may be determined dynamically while the user is interacting with objects in an artificial environment (e.g., 401 or 501 of FIG. 4 or 5, respectively).

Figure 8:
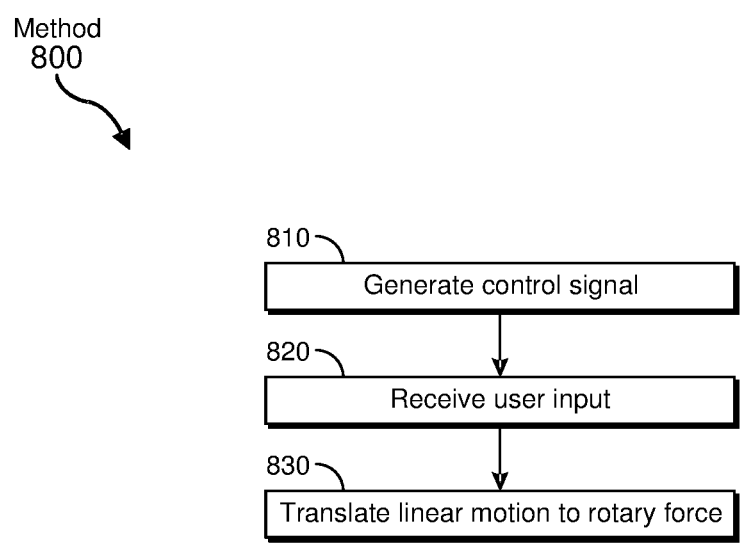
FIG. 8 is a flow diagram of an exemplary method for controlling an actuator to provide a variable amount of resistance in a peripheral device.

FIG. 8 is a flow diagram of an exemplary computer-implemented method 800 for controlling an actuator to provide a variable amount of resistance or force feedback in a peripheral device. The steps shown in FIG. 8 may be performed by any suitable computer-executable code and/or computing system, including the system illustrated in FIGS. 1A and 1B. In one example, each of the steps shown in FIG. 8 may represent an algorithm whose structure includes and/or is represented by multiple sub-steps, examples of which will be provided in greater detail below.

As illustrated in FIG. 8, at step 810 one or more of the systems described herein may generate a control signal for an actuator 109 that is configured to provide substantially linear motion along a specified axis in response to the control signal. At step 810, the systems described herein may receive an input from a user via an input component or trigger 102. The input component 102 may be hingedly coupled to a substructure 110 that is configured to support the input component 102. At step 830, the systems described herein may translate the substantially linear motion provided by the actuator 109 to a rotary force applied to the input component 102 via a mechanical linkage 106. The mechanical linkage 106 may be coupled to the input component 102 and to at least a portion of the actuator 109.

In some embodiments, the peripheral device 100 of FIG. 1A may further include a pressure sensor 101 or other type of sensor. The pressure sensor may be configured to sense an input pressure applied to the input component. This sensed input pressure at the input component 102 may be implemented in a feedback loop to provide a rotary counterpressure on the input component (as generally shown in FIGS. 3A-3C). In such cases, the amount of rotary counterpressure may depend on the current position of the actuator along the specified axis. Thus, for example, if a user is performing an action in an artificial environment (e.g., painting with a virtual paintbrush), the thickness of the user's strokes may be tied to the amount of pressure applied to the input component. Thus, if the user is pressing hard on a button or squeezing hard on the trigger, the thickness of the user's virtual paintbrush strokes may be thicker, whereas if the user is pressing softly on the button or is gently squeezing the trigger, the thickness of the user's virtual paintbrush may be thinner. Thus, the amount of pressure sensed by the pressure sensor may affect properties or characteristics of actions or of items in a virtual environment.

In other cases, the amount of rotary counterpressure applied to the input component may be specified in a profile. For example, if a user is swinging a golf club in an artificial environment, the actuator may apply a counterpressure while the user is squeezing the trigger according to a profile designed to simulate the pressure changes that occur when swinging a golf club. For instance, the pressure may start off relatively low (as it is when the golf club is raised in the air), and then move to increased pressure as the golf club lowers and swings, and then move back to a low pressure after the swing completes. Many other profiles may be programmed and implemented within the system to variably actuate the trigger or button to feel as if interacting with a specific real-life object or to simulate a specified experience in virtual environment. Each peripheral device profile may specify different amounts of rotary counterpressure for different amounts of input pressure applied by the user to the input component, and may even apply different profiles for different types of input components.

Accordingly, in this manner, methods and systems are provided for controlling an actuator to provide a variable amount of resistance or force feedback in a peripheral device. The peripheral device may be configured to provide smooth, controllable tactile feedback to a user via any of a variety of different input components including buttons and triggers. The improved tactile feedback may allow many different forms of feedback and different sensations when interacting with a video game or with a virtual world. This feedback may allow the user to feel more immersed within their video game or virtual world, leading to a more involved and more enjoyable user experience.

Example Embodiments

Example 1. A system may include a substructure configured to support one or more components, an actuator configured to provide substantially linear motion along a specified axis in response to an electrical input, at least one input component hingedly coupled to the substructure, the input component being configured to receive input from a user, and a mechanical linkage coupled to the input component and to at least a portion of the actuator, the mechanical linkage being configured to translate the substantially linear motion provided by the actuator to a rotary force applied to the input component via the mechanical linkage.

Example 2. The system of Example 1, wherein the system comprises an electronic peripheral device.

Example 3. The system of any of Examples 1 and 2, wherein the electronic peripheral device comprises a wireless game controller.

Example 4. The system of any of Examples 1-3, wherein the input component comprises a force feedback trigger mounted to the wireless game controller.

Example 5. The system of any of Examples 1-4, wherein the rotary force applied to the input component is variable.

Example 6. The system of any of Examples 1-5, further comprising an optical encoder configured to determine the current position of the actuator.

Example 7. The system of any of Examples 1-6, wherein the actuator provides a variable amount of force based on the current position of the actuator.

Example 8. The system of any of Examples 1-7, wherein the actuator comprises a voice coil actuator.

Example 9. The system of any of Examples 1-8, wherein the actuator moves along the specified axis until a specified stop position is reached.

Example 10. The system of any of Examples 1-9, wherein the stop position is indicated via a software input.

Example 11. The system of any of Examples 1-10, wherein the software input indicating the stop position for the actuator corresponds to a virtual object created in a virtual environment.

Example 12. A computer-implemented method may include generating a control signal for an actuator that is configured to provide substantially linear motion along a specified axis in response to the control signal, receiving an input from a user via an input component, the input component being hingedly coupled to a substructure that is configured to support the input component, and translating the substantially linear motion provided by the actuator to a rotary force applied to the input component via a mechanical linkage, wherein the mechanical linkage is coupled to the input component and to at least a portion of the actuator.

Example 13. The computer-implemented method of claim 12, further comprising sensing an input pressure applied to the input component using a pressure sensor.

Example 14. The computer-implemented method of any of Examples 12 and 13, further comprising implementing the input pressure sensed at the input component in a feedback loop to provide a rotary counterpressure on the input component using the actuator.

Example 15. The computer-implemented method of any of Examples 12-14, wherein the amount of rotary counterpressure depends on the current position of the actuator along the specified axis.

Example 16. The computer-implemented method of any of Examples 12-15, wherein the amount of rotary counterpressure applied to the input component is specified in a device profile.

Example 17. The computer-implemented method of any of Examples 12-16, wherein the device profile specifies different amounts of rotary counterpressure for different amounts of input pressure applied to the input component.

Example 18. The computer-implemented method of any of Examples 12-17, wherein the device profile corresponds to a specified experience that is being simulated in an artificial reality environment.

Example 19. The computer-implemented method of any of Examples 12-18, wherein the device profile simulates a texture of an object that is being simulated in an artificial reality environment.

Example 20. A non-transitory computer-readable medium may include one or more computer-executable instructions that, when executed by at least one processor of a computing device, cause the computing device to: generate a control signal for an actuator that is configured to provide substantially linear motion along a specified axis in response to the control signal, receive an input from a user via an input component, the input component being hingedly coupled to a substructure that is configured to support the input component; and translate the substantially linear motion provided by the actuator to a rotary force applied to the input component via a mechanical linkage, wherein the mechanical linkage is coupled to the input component and to at least a portion of the actuator Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 900 in FIG. 9) or that visually immerses a user in an artificial reality (e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
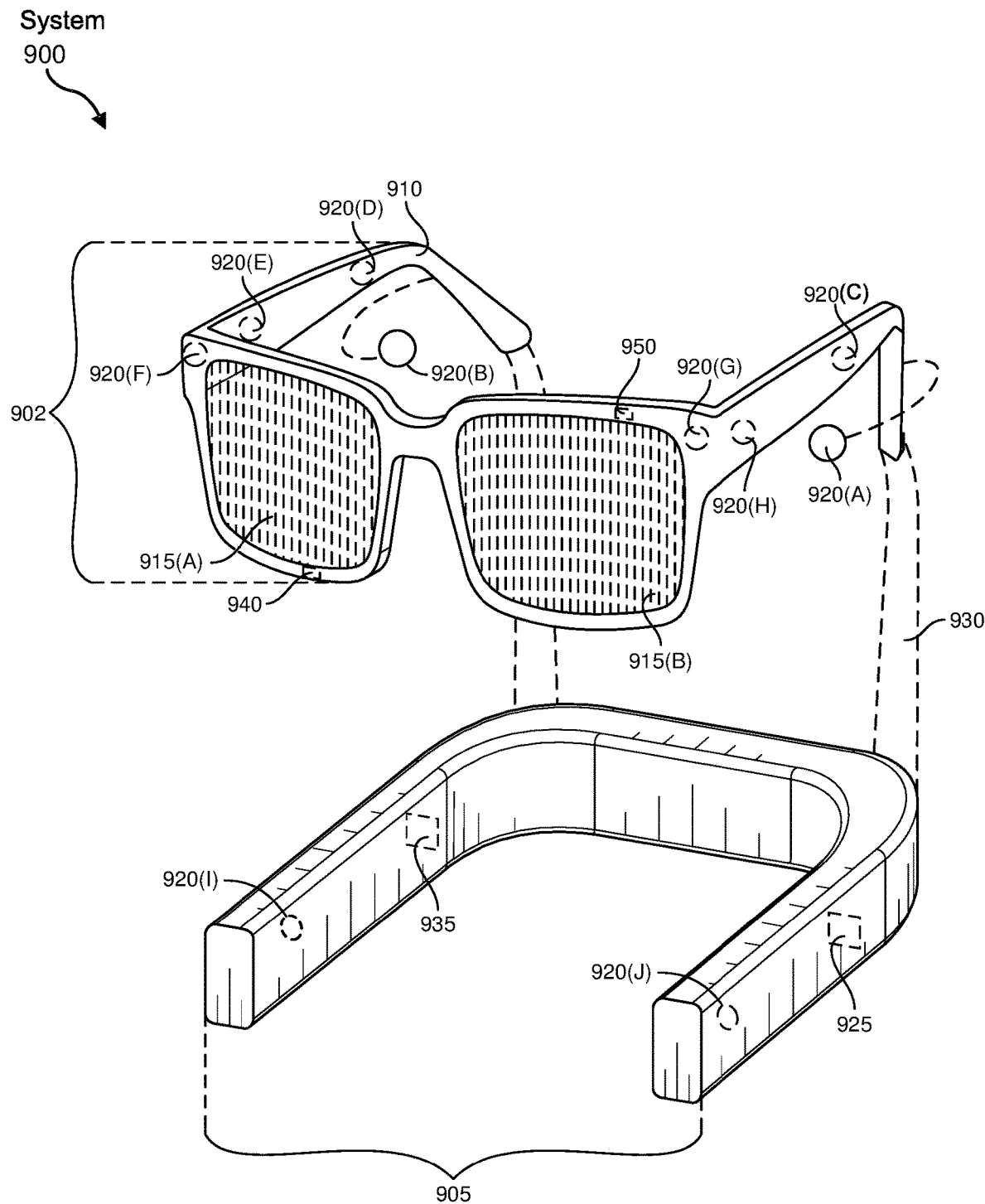
FIG. 9 is an illustration of exemplary augmented-reality glasses that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

Augmented-reality system 900 may also include a microphone array with a plurality of acoustic transducers 920(A)-920(J), referred to collectively as acoustic transducers 920. Acoustic transducers 920 may be transducers that detect air pressure variations induced by sound waves. Each acoustic transducer 920 may be configured to detect sound and convert the detected sound into an electronic format (e.g., an analog or digital format). The microphone array in FIG. 2 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(F) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a Bluetooth connection).

In still other embodiments, acoustic transducers 920(A) and 920(B) may not be used at all in conjunction with augmented-reality system 900.

Acoustic transducers 920 on frame 910 may be positioned along the length of the temples, across the bridge, above or below display devices 915(A) and 915(B), or some combination thereof. Acoustic transducers 920 may be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 10, 1006(A), and 1006(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

Figure 10:
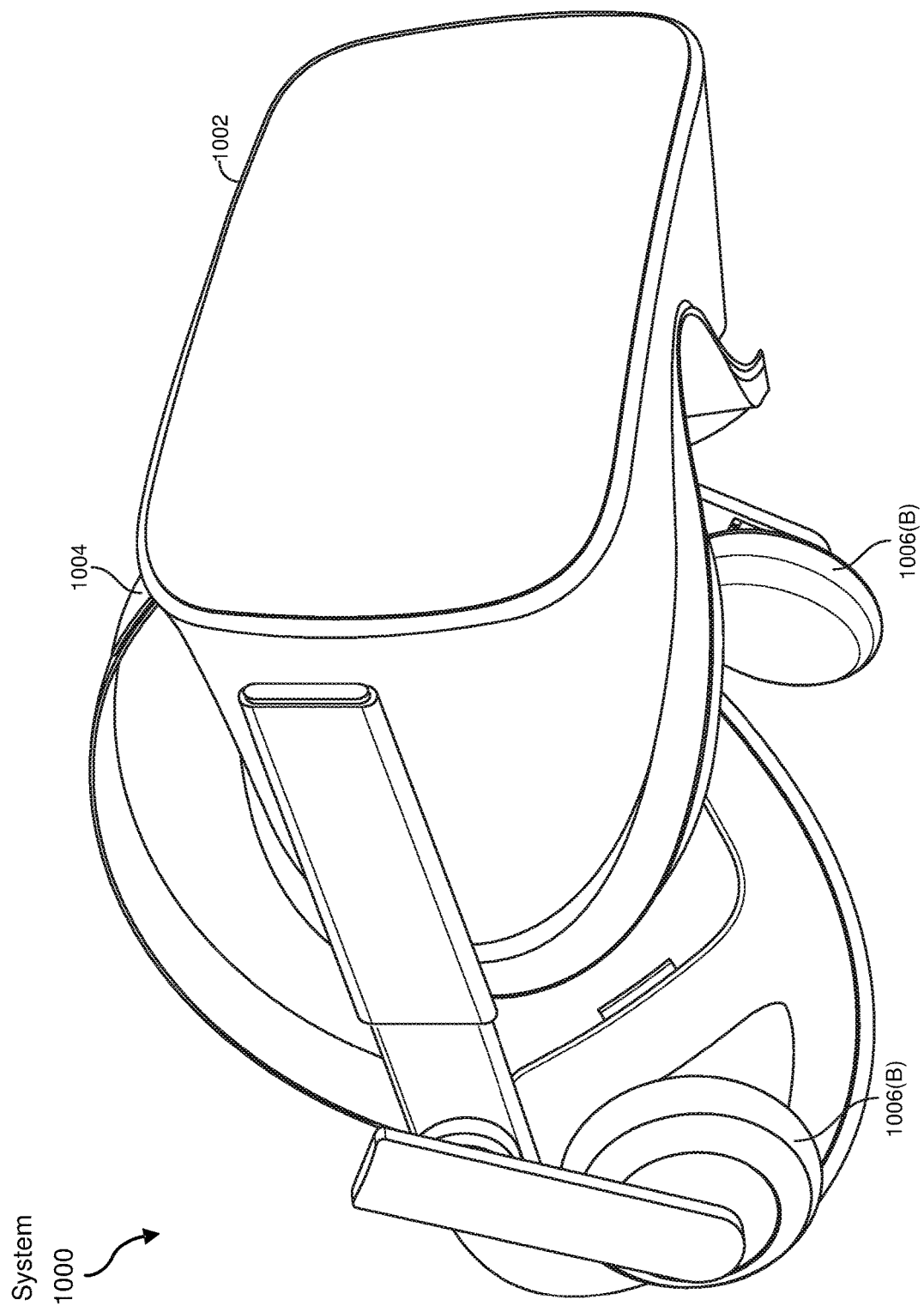
FIG. 10 is an illustration of an exemplary virtual-reality headset that may be used in connection with embodiments of this disclosure.

While not shown in FIG. 10, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 900 and 1000 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 11:
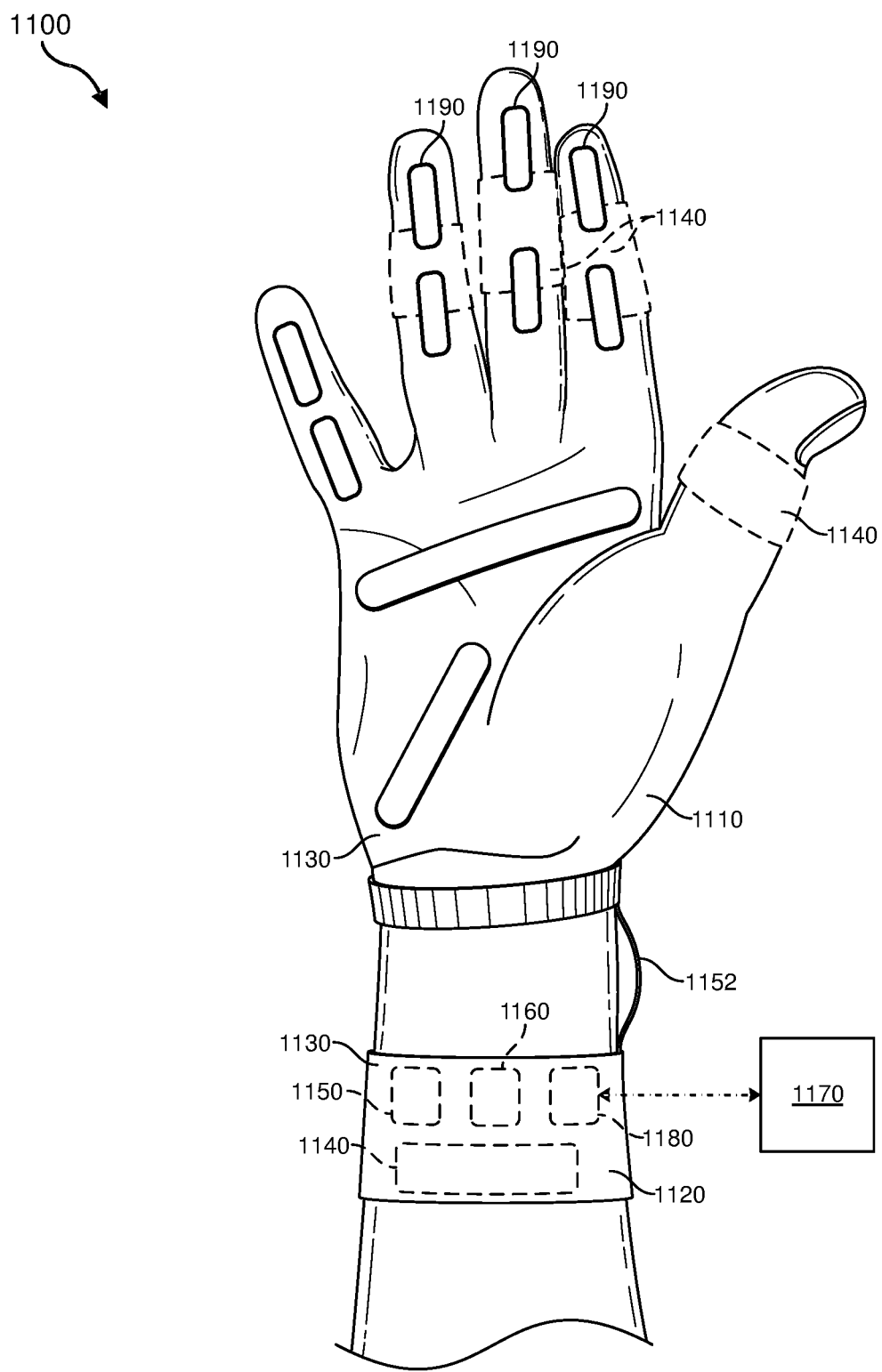
FIG. 11 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned against the user's finger(s), thumb, or wrist, as shown in FIG. 11. Vibrotactile devices 1140 may, in some examples, be sufficiently flexible to conform to or bend with the user's corresponding body part(s).

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, Bluetooth, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Figure 12:
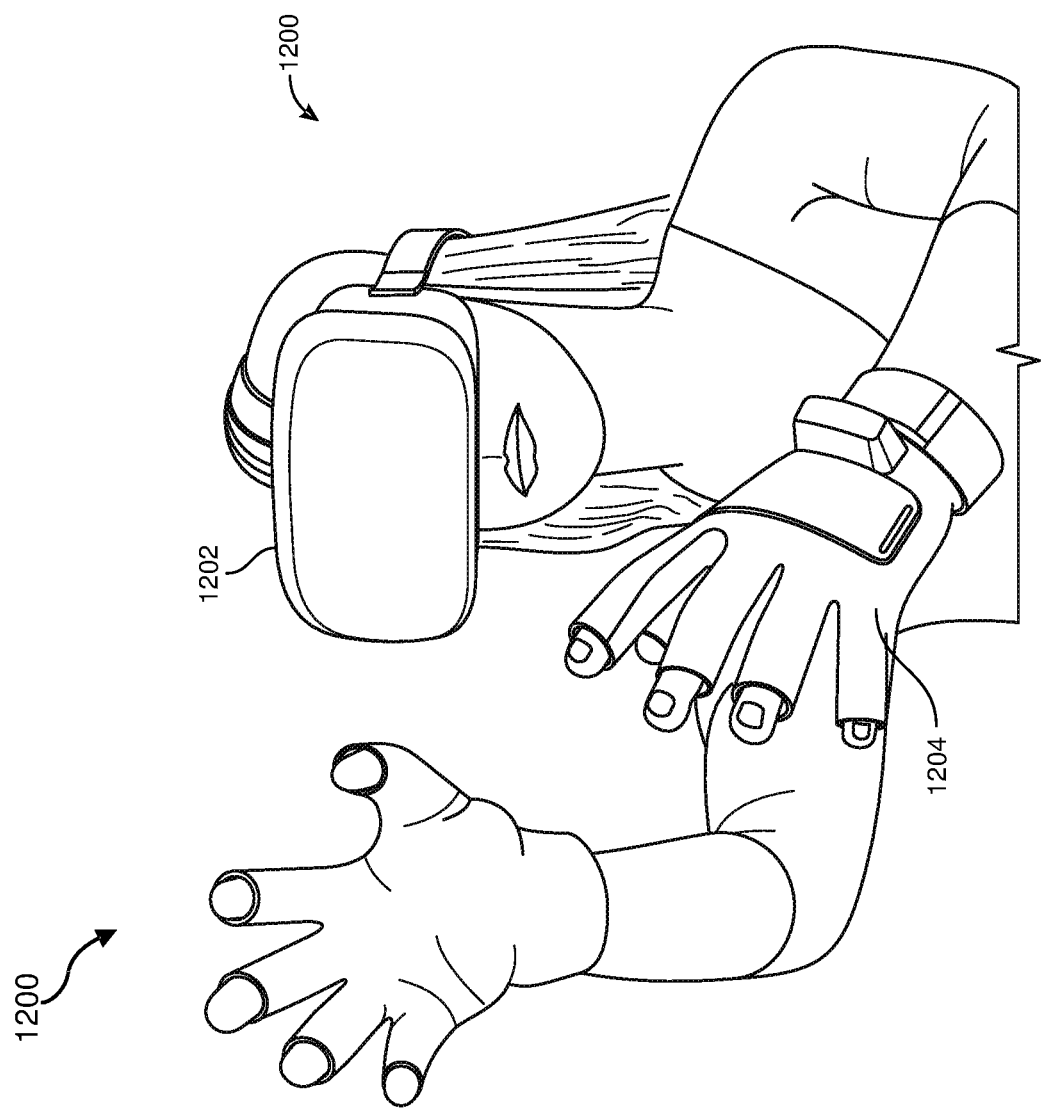
FIG. 12 is an illustration of an exemplary virtual-reality environment according to embodiments of this disclosure.

Haptic wearables, such as those shown in and described in connection with FIG. 11, may be implemented in a variety of types of artificial-reality systems and environments. FIG. 12 shows an example artificial-reality environment 1200 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1202 generally represents any type or form of virtual-reality system, such as virtual-reality system 1000 in FIG. 10. Haptic device 1204 generally represents any type or form of wearable device, worn by a user of an artificial-reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

Figure 13:
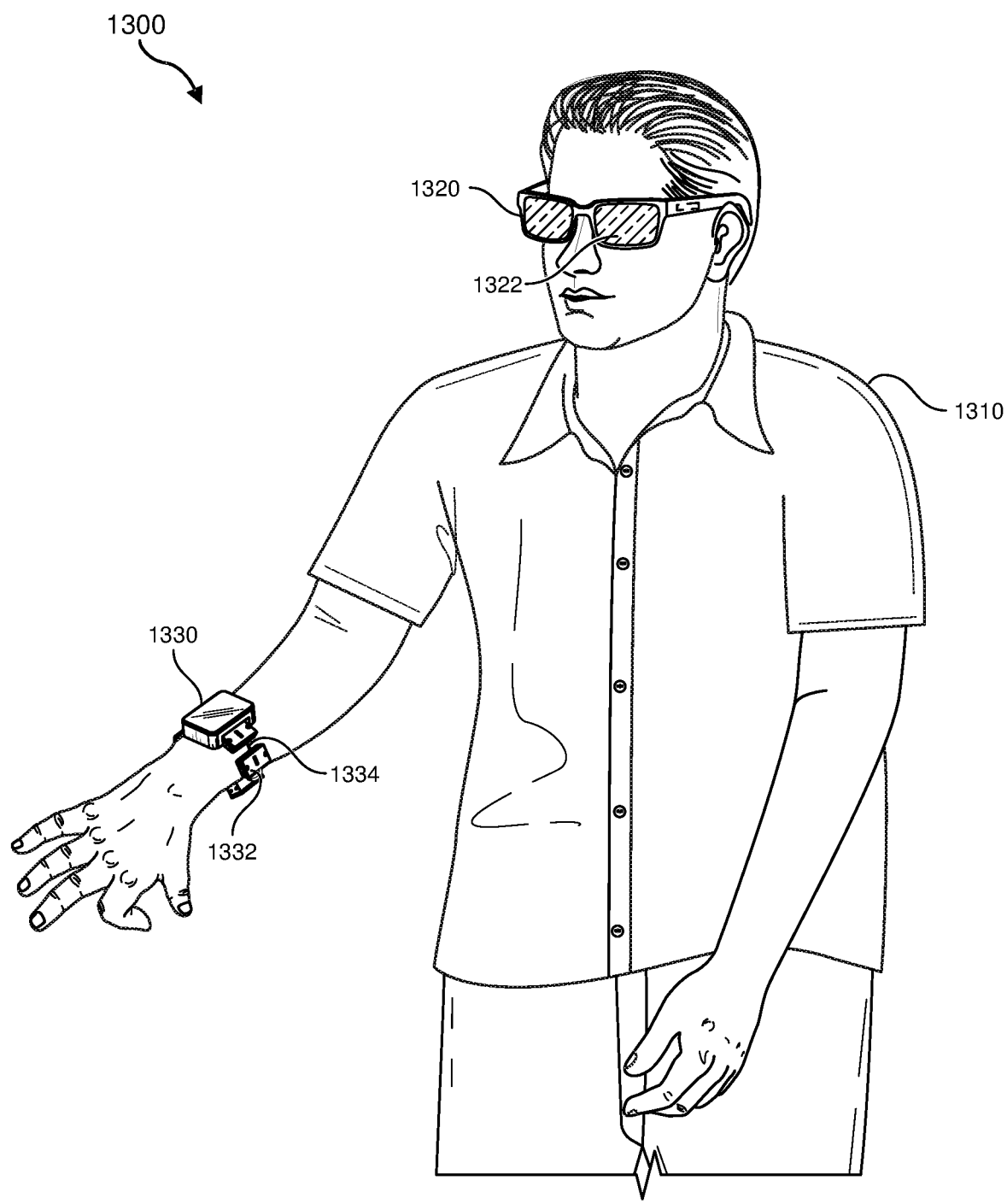
FIG. 13 is an illustration of an exemplary augmented-reality environment according to embodiments of this disclosure.

While haptic interfaces may be used with virtual-reality systems, as shown in FIG. 12, haptic interfaces may also be used with augmented-reality systems, as shown in FIG. 13. FIG. 13 is a perspective view of a user 1310 interacting with an augmented-reality system 1300. In this example, user 1310 may wear a pair of augmented-reality glasses 1320 that may have one or more displays 1322 and that are paired with a haptic device 1330. In this example, haptic device 1330 may be a wristband that includes a plurality of band elements 1332 and a tensioning mechanism 1334 that connects band elements 1332 to one another.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer, sensor, and/or feedback mechanism. For example, haptic devices 1110, 1120, 1204, and 1330 may include one or more mechanical transducers, piezoelectric transducers, and/or fluidic transducers. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to generate a control signal, use the result of the transformation to control an actuator, and store the result of the transformation to log the movement. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a substructure configured to support one or more components;
   an actuator positioned at the base of the substructure, the actuator being configured to provide substantially linear motion along an axis that is perpendicular to the base of the substructure in response to an electrical input;
   at least one input component including a top portion and a bottom portion, the top portion of the input component being hingedly coupled at a first hinged attachment point to the substructure and the bottom portion of the input component being hingedly coupled at a second hinged attachment point to a mechanical linkage, the input component being configured to receive input from a user; and
   the mechanical linkage coupled to the bottom portion of the input component and to at least a portion of the actuator via the second hinged attachment point, the mechanical linkage being configured to translate the substantially linear motion provided by the actuator to a rotary force applied to the input component via the mechanical linkage,
   wherein the actuator is configured to vary the amount of linear motion applied to the input component based on a determined amount of input force applied to the input component by the user, such that the actuator applies a variable rotational resistance to the user's input force at the input component.

2. The system of claim 1, wherein the system comprises an electronic peripheral device.

3. The system of claim 2, wherein the electronic peripheral device comprises a wireless game controller.

4. The system of claim 3, wherein the input component comprises a force feedback trigger mounted to the wireless game controller.

5. The system of claim 1, wherein the rotary force applied to the input component is variable.

6. The system of claim 1, further comprising an optical encoder configured to determine the current position of the actuator.

7. The system of claim 6, wherein the actuator provides a variable amount of force based on the current position of the actuator.

8. The system of claim 1, wherein the actuator comprises a voice coil actuator.

9. The system of claim 1, wherein the actuator moves along the specified axis until a specified stop position is reached.

10. The system of claim 9, wherein the stop position is indicated via a software input.

11. The system of claim 10, wherein the software input indicating the stop position for the actuator corresponds to a virtual object created in a virtual environment.

12. A computer-implemented method, comprising:
    generating a control signal for an actuator positioned at the base of a substructure, the actuator being configured to provide substantially linear motion along an axis that is perpendicular to the base of the substructure in response to the control signal;
    receiving an input from a user via an input component, the input component including a top portion and a bottom portion, the top portion of the input component being hingedly coupled at a first hinged attachment point to the substructure and the bottom portion of the input component being hingedly coupled at a second hinged attachment point to a mechanical linkage; and
    translating the substantially linear motion provided by the actuator to a rotary force applied to the input component via the mechanical linkage, wherein the mechanical linkage is coupled to the bottom portion of the input component and to at least a portion of the actuator via the second hinged attachment point,
    wherein the actuator is configured to vary the amount of linear motion applied to the input component based on a determined amount of input force applied to the input component by the user, such that the actuator applies a variable rotational resistance to the user's input force at the input component.

13. The computer-implemented method of claim 12, further comprising sensing an input pressure applied to the input component using a pressure sensor.

14. The computer-implemented method of claim 13, further comprising implementing the input pressure sensed at the input component in a feedback loop to provide a rotary counterpressure on the input component using the actuator.

15. The computer-implemented method of claim 14, wherein the amount of rotary counterpressure depends on the current position of the actuator along the specified axis.

16. The computer-implemented method of claim 14, wherein the amount of rotary counterpressure applied to the input component is specified in a device profile.

17. The computer-implemented method of claim 16, wherein the device profile specifies different amounts of rotary counterpressure for different amounts of input pressure applied to the input component.

18. The computer-implemented method of claim 16, wherein the device profile corresponds to a specified experience that is being simulated in an artificial reality environment.

19. The computer-implemented method of claim 16, wherein the device profile simulates a texture of an object that is being simulated in an artificial reality environment.

20. A non-transitory computer-readable medium comprising one or more computer-executable instructions that, when executed by at least one processor of a computing device, cause the computing device to:

> generate a control signal for an actuator positioned at the base of a substructure, the actuator being configured to provide substantially linear motion along an axis that is perpendicular to the base of the substructure in response to the control signal;
>
> receive an input from a user via an input component, the input component including a top portion and a bottom portion, the top portion of the input component being hingedly coupled at a first hinged attachment point to the substructure and the bottom portion of the input component being hingedly coupled at a second hinged attachment point to a mechanical linkage; and
>
> translate the substantially linear motion provided by the actuator to a rotary force applied to the input component via the mechanical linkage, wherein the mechanical linkage is coupled to the bottom portion of the input component and to at least a portion of the actuator via the second hinged attachment point,
>
> wherein the actuator is configured to vary the amount of linear motion applied to the input component based on a determined amount of input force applied to the input component by the user, such that the actuator applies a variable rotational resistance to the user's input force at the input component.

\* \* \* \* \*